United States Patent
Sugiyama et al.

(10) Patent No.: US 12,271,559 B2
(45) Date of Patent: Apr. 8, 2025

(54) INPUT DETECTION APPARATUS, INPUT DETECTION METHOD, AND RECORDING MEDIUM STORING INPUT DETECTION PROGRAM FOR DETECTING INPUT POSITION WITH RESPECT TO A DISPLAY PANEL

(71) Applicant: SHARP KABUSHIKI KAISHA, Sakai (JP)

(72) Inventors: Koichi Sugiyama, Sakai (JP); Shinya Higashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/659,434

(22) Filed: May 9, 2024

(65) Prior Publication Data

US 2024/0411408 A1 Dec. 12, 2024

(30) Foreign Application Priority Data

Jun. 7, 2023 (JP) ................................ 2023-093967

(51) Int. Cl.
*G06F 3/041* (2006.01)
*G06F 3/042* (2006.01)
*G06F 3/044* (2006.01)

(52) U.S. Cl.
CPC ........ *G06F 3/04186* (2019.05); *G06F 3/0421* (2013.01); *G06F 3/044* (2013.01); *G06F 2203/04101* (2013.01); *G06F 2203/04106* (2013.01)

(58) Field of Classification Search
CPC .... G06F 3/04186; G06F 3/0421; G06F 3/044; G06F 2203/04101; G06F 2203/04106
See application file for complete search history.

(56) References Cited

U.S. PATENT DOCUMENTS

| | | | | |
|---|---|---|---|---|
| 6,504,530 B1* | 1/2003 | Wilson | ................ | G06F 3/04186 345/173 |
| 2010/0245289 A1* | 9/2010 | Svajda | .................. | G06F 3/0421 345/175 |
| 2014/0267154 A1 | 9/2014 | Yamaguchi et al. | | |

FOREIGN PATENT DOCUMENTS

JP 2014-178868 A 9/2014

* cited by examiner

*Primary Examiner* — Afroza Chowdhury
(74) *Attorney, Agent, or Firm* — ScienBiziP, P.C.

(57) ABSTRACT

A display device includes a first position detection pressing circuit that detects a first position of the input operation at the first sensor, a second position detection pressing circuit that detects a second position of the input operation at the second sensor, and an input position detection pressing circuit that detects the input position with respect to the display panel based on the first position detected by the first position detection pressing circuit and the second position detected by the second position detection pressing circuit.

7 Claims, 12 Drawing Sheets

INPUT DETECTION APPARATUS, INPUT DETECTION METHOD, AND RECORDING MEDIUM STORING INPUT DETECTION PROGRAM FOR DETECTING INPUT POSITION WITH RESPECT TO A DISPLAY PANEL

INCORPORATION BY REFERENCE

This application is based upon and claims the benefit of priority from the corresponding Japanese Patent Application No. 2023-093967 filed on Jun. 7, 2023, the entire contents of which are incorporated herein by reference.

BACKGROUND

The present disclosure relates to an input detection apparatus, an input detection method, and a recording medium storing an input detection program for detecting the input position of an input means with respect to a display panel.

In the related art, a display device is known that allows for an input operation (screen operation) such as an instruction operation in a non-contact manner with respect to the display screen of a display panel. In addition, in a system for performing a non-contact instruction operation (hovering operation) by using a capacitive touch panel, a technique is known that when the flatness ratio of the region occupied by an instructing member (e.g., a user's finger) is smaller than a threshold value, the coordinate of the center of that region is enabled, whereas when the flatness ratio is greater than the threshold value, the coordinate of the center of that region is disabled so as to prevent operations due to the user's unintended operations.

However, with the known technique, it is difficult to appropriately detect the position of the direction pointed by the finger when the user points the finger from an oblique direction with respect to the touch panel, for example.

SUMMARY

An object of the present disclosure is to provide an input detection apparatus, an input detection method, and a recording medium storing an input detection program that can improve the detection accuracy of the input position of an input operation with respect to a display panel.

An input detection apparatus according to an aspect of the present disclosure detects an input position of an input operation with an input means with respect to a display panel including a display, a first sensor of capacitive type and a second sensor of infrared type. The input detection apparatus includes a first position detection processing unit, a second position detection processing unit, and an input position detection processing unit. The first position detection processing unit detects a first position of the input operation at the first sensor. The second position detection processing unit detects a second position of the input operation at the second sensor. The input position detection processing unit detects the input position with respect to the display panel based on the first position detected by the first position detection processing unit and the second position detected by the second position detection processing unit.

An input detection method according to another aspect of the present disclosure is a method of detecting an input position of an input operation with an input means with respect to a display panel including a first sensor of capacitive type and a second sensor of infrared type. The input detection method is executed by one or a plurality of processors, the input detection method including detecting a first position of the input operation at the first sensor, detecting a second position of the input operation at the second sensor, and detecting the input position with respect to the display panel based on the first position and the second position.

A non-transitory computer-readable recording medium according to another aspect of the present disclosure stores an input detection program that detects an input position of an input operation with an input means with respect to a display panel including a first sensor of capacitive type and a second sensor of infrared type. The input detection program causes one or a plurality of processors to execute detecting a first position of the input operation at the first sensor, detecting a second position of the input operation at the second sensor, and detecting the input position with respect to the display panel based on the first position and the second position.

According to the present disclosure, it is possible to provide an input detection apparatus, an input detection method, and a recording medium storing an input detection program that can improve the detection accuracy of the input position of an input operation with respect to a display panel.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure are described below with reference to the attached drawings. The following embodiments are examples of the present disclosure and do not limit the technical scope of the present disclosure.

Figure 1:
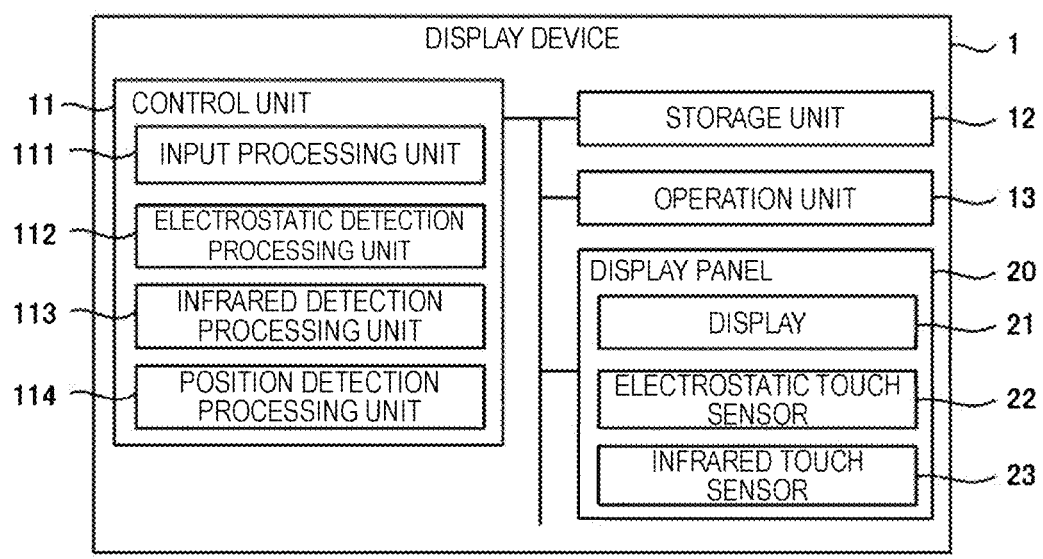
FIG. 1 is a block diagram illustrating a configuration of a display device according to an embodiment of the present disclosure.

As illustrated in FIG. 1, a display device 1 according to an embodiment of the present disclosure includes a control unit 11, a storage unit 12, an operation unit 13, and a display panel 20. The display panel 20 includes a display 21, an electrostatic touch sensor 22, and an infrared touch sensor 23. The display panel 20 may be disposed outside the display device 1 and communicatively connected to the display device 1.

Figure 2:
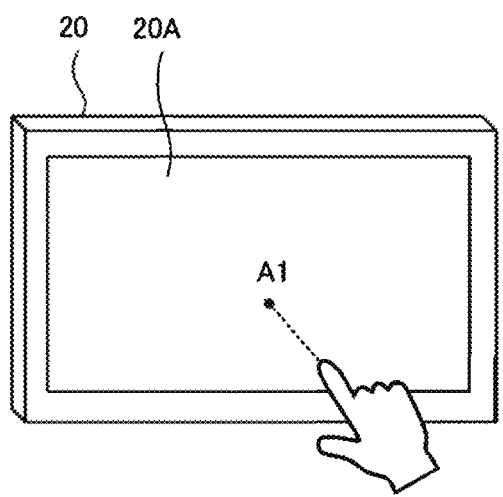
FIG. 2 is a schematic view illustrating an example of a hovering operation in the display device according to the embodiment of the present disclosure.
Figure 3:
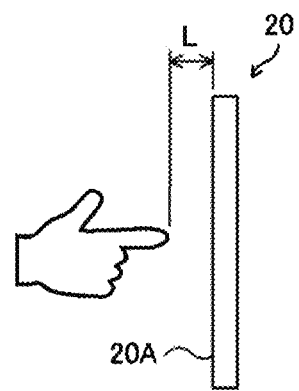
FIG. 3 is a schematic view illustrating an example of the hovering operation in the display device according to the embodiment of the present disclosure.

The display device 1 is a display device that receives a non-contact input operation (hereinafter referred to as hovering operation) of the user with respect to a display screen 20A of the display panel 20. As illustrated in FIGS. 2 and 3, for example, when a user's finger comes close to the display screen 20A and a distance L between the finger and the display screen 20A becomes a predetermined distance or smaller, the display device 1 detects the finger, and detects a hovering operation corresponding to the position of the finger (input position). Then, the display device 1 executes an input process corresponding to the user's hovering operation with respect to the display screen 20A. For example, when the user performs a hovering operation at a predetermined position in the display screen 20A, the display device 1 detects the position on the display screen 20A corresponding to the position of the hovering operation, and receives a selection operation for selecting the selection object with an input operation icon A1 displayed on the display screen 20A.

The hovering operation means an operation corresponding to an operation of putting the input operation icon A1 (such as a cursor) over a specific element by using an input means (such as a user's hand or fingertip, a stylus pen, and a support rod) with respect to the display panel 20 (the display screen 20A), and means an operation of a state before touching the display panel 20 (a hovering state with the input means being floated). In addition, the hovering state means a state where the distance between the input means and the display panel 20 is a predetermined distance or smaller and the input means and the display panel 20 are not in contact with each other, i.e., a state where the input means is in close proximity.

Note that the display device 1 can receive an input operation of the user touching the display panel 20 (the display screen 20A) (hereinafter referred to as touch operation). A selection operation of selecting a selection object with the input operation icon A1 in accordance with the touch operation is a known technique, and therefore the description thereof is omitted below.

Details of a configuration related to the hovering operation in the display device 1 are described below.

The display device 1 includes a capacitive first sensor (the electrostatic touch sensor 22) and an infrared second sensor (the infrared touch sensor 23), and detects the input position with respect to the display panel 20 based on the detection result of the sensors.

The display 21 is a display that displays images, and is, for example, a liquid crystal display. The operation unit 13 is an operation apparatus such as a mouse, and a keyboard. Note that the display 21 and the operation unit 13 may be integrally composed of a touch panel.

Figure 4:
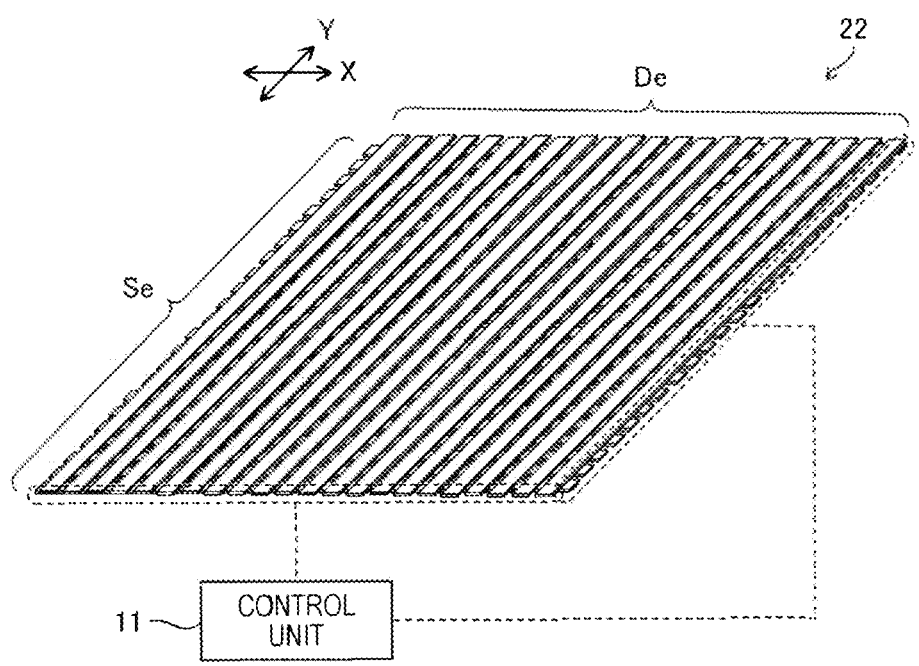
FIG. 4 is a diagram illustrating a configuration of an electrostatic touch sensor according to the embodiment of the present disclosure.

The electrostatic touch sensor 22 is a surface or projection capacitive sensor, for example. Note that the electrostatic touch sensor 22 may be composed of a touch panel stacked on the surface of the display 21. FIG. 4 illustrates a configuration of the electrostatic touch sensor 22. The electrostatic touch sensor 22 includes a plurality of drive electrodes De (drive electrodes) arranged in the X direction, and a plurality of sensing electrodes Se (detection electrodes) arranged in the Y direction. The control unit 11 inputs a drive signal (driving signal) to the drive electrode De, and the sensing electrode Se outputs a detection signal (sensing signal) to the control unit 11. The detection signal corresponds to the capacitance value (capacitance) between the drive electrode De and the sensing electrode Se. The control unit 11 detects the input position with respect to the electrostatic touch sensor 22 corresponding to the hovering operation based on the change of the capacitance corresponding to the detection signal. The arrangement position of the drive electrode De and the sensing electrode Se is not limited as long as they are disposed to intersect each other.

Figure 5:
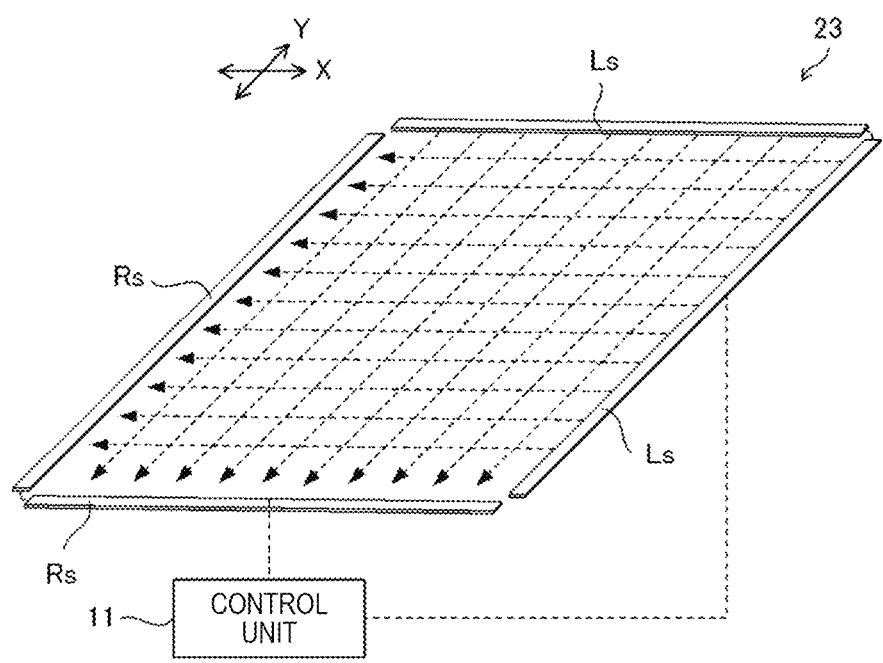
FIG. 5 is a diagram illustrating a configuration of an infrared touch sensor according to the embodiment of the present disclosure.

The infrared touch sensor 23 is a projection type infrared sensor that uses infrared rays (infrared light), for example. The infrared touch sensor 23 is disposed on the front surface of the electrostatic touch sensor 22. FIG. 5 illustrates a configuration of the infrared touch sensor 23. The infrared touch sensor 23 includes a light emission unit Ls (light-emitting element) and a light reception unit Rs (light-receiving element) disposed and paired in the X direction and the Y direction. The control unit 11 emits an infrared ray (infrared light) from the light emission unit Ls and detects the input position with respect to the infrared touch sensor 23 corresponding to the hovering operation based on the detection signal of the light reception unit Rs that receives the infrared ray. For example, the control unit 11 detects a position where the infrared ray is blocked as the input position.

The storage unit 12 is a nonvolatile storage unit that stores various information, such as an HDD (Hard Disk Drive), an SSD (Solid State Drive), and a flash memory. The storage unit 12 stores control programs such as an input detection program for causing the control unit 11 to execute an input detection process described later (see FIG. 11). For example, the input detection program is recorded in a non-transitory manner in a computer-readable recording medium such as a CD or a DVD, and stored in the storage unit 12 by being read by a reading device (not illustrated in the drawing) such as a CD drive or a DVD drive provided in the display device 1. Note that the input detection program may be delivered from a cloud server and stored in the storage unit 12.

The control unit 11 includes controllers such as a CPU, a ROM, and a RAM. The CPU is a processor that executes various arithmetic processes. The ROM is a nonvolatile storage unit that preliminarily stores control programs such as BIOS and OS for causing the CPU to execute various arithmetic processes. The RAM is a volatile or nonvolatile storage unit that stores various information, and is used as a temporary storage memory (work area) for various processes to be executed by the CPU. The control unit 11 controls the display device 1 by causing the CPU to execute various control programs preliminarily stored in the ROM or the storage unit 12. The control unit 11 detects the input position of an input operation with the input means with respect to the display panel 20.

Figure 6:
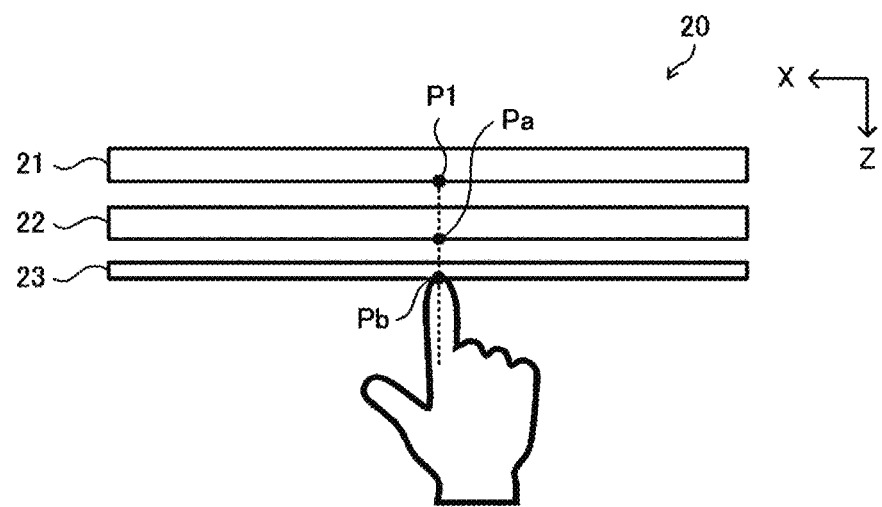
FIG. 6 is a schematic view illustrating an example of a detection method for an input position in a known display device.
Figure 7:
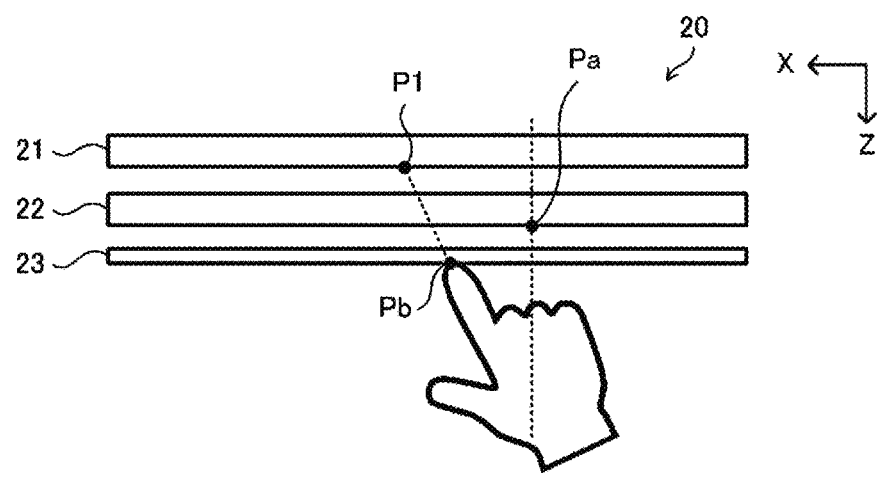
FIG. 7 is a schematic view illustrating an example of the detection method for the input position in a known display device.

In a known technique, when the user points a finger from an oblique direction with respect to the display panel 20, it is difficult to appropriately detect the position of the direction pointed by the finger, for example. FIGS. 6 and 7 illustrate specific examples of input operations. For example, when the user points a finger from the vertical direction with respect to the display panel 20 as illustrated in FIG. 6, a known system detects a position Pb with the infrared touch sensor 23 and detects a position Pa with the electrostatic touch sensor 22. In this case, the X coordinate positions and the Y coordinate positions of the position Pb and the position Pa substantially match, and therefore the known system detects the position Pb and the position Pa as an input position P1. In this manner, when the user points a finger from the vertical direction with respect to the display panel 20, the input position P1 intended by the user can be appropriately detected.

Conversely, for example, when the user points a finger from an oblique direction with respect to the display panel 20 as illustrated in FIG. 7, the known system detects the position Pb with the infrared touch sensor 23 and detects the position Pa with the electrostatic touch sensor 22. In this case, the X coordinate positions and the Y coordinate positions of the position Pb and the position Pa do not match each other. As a result, the known system detects the position Pb or the position Pa as the input position, which is shifted from the input position P1 intended by the user.

Regarding the above-described problem, the display device 1 according to the present embodiment has a configuration that can improve the detection accuracy of the input position of the input operation with respect to the display panel 20.

More specifically, as illustrated in FIG. 1, the control unit 11 includes various processing units such as an input processing unit 111, an electrostatic detection processing unit 112, an infrared detection processing unit 113, and a position detection processing unit 114. Note that the control unit 11 functions as the input processing unit 111, the electrostatic detection processing unit 112, the infrared detection processing unit 113, and the position detection processing unit 114 by executing various processes with the CPU in accordance with the input detection program. In addition, some or all processing units included in the control unit 11 may be composed of an electronic circuit. Note that the input detection program may be a program for a plurality of processors to function as the various processing units.

The input processing unit 111 inputs a control signal (driving signal) to each of the electrostatic touch sensor 22 and the infrared touch sensor 23. More specifically, the input processing unit 111 drives each drive electrode De by sequentially inputting driving signals to each drive electrode De of the electrostatic touch sensor 22. In addition, the input processing unit 111 causes each light emission unit Ls to emit an infrared ray by sequentially inputting a driving signal to each light emission unit Ls of the infrared touch sensor 23.

The electrostatic detection processing unit 112 detects a change of the capacitance generated between the input means performing the input operation and the electrostatic touch sensor 22. For example, the electrostatic detection processing unit 112 receives the detection signal output from the sensing electrode Se in accordance with the driving signal input to the drive electrode De, and detects the amount of change of the capacitance based on the detection signal.

Figure 8:
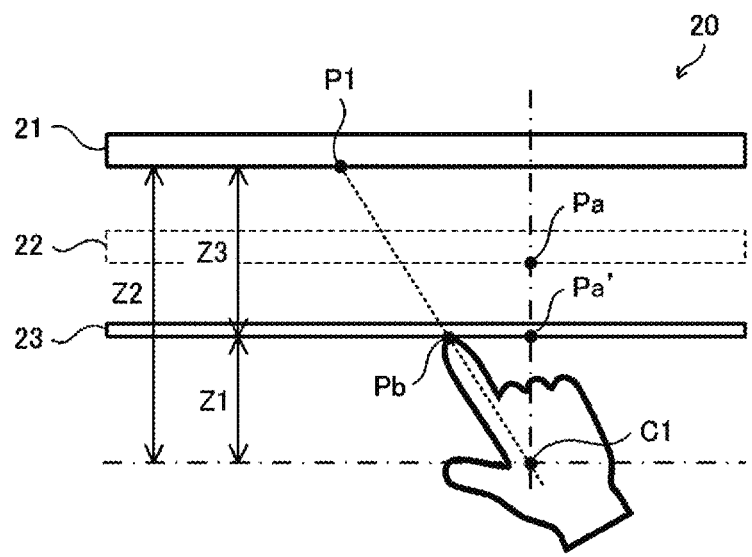
FIG. 8 is a schematic view illustrating an example of the detection method for the input position in the display device according to the embodiment of the present disclosure.

In addition, the electrostatic detection processing unit 112 detects the input position (electrostatic input position Pa) with respect to the electrostatic touch sensor 22 based on the change of the capacitance (see FIG. 8, etc.). For example, the electrostatic detection processing unit 112 refers to the distribution of the change of the capacitance acquired from the electrostatic touch sensor 22, and detects the position with the largest change (such as the position of the center of gravity C1 of a hand) as the electrostatic input position Pa. The electrostatic detection processing unit 112 is an example of the first position detection processing unit of the present disclosure.

The infrared detection processing unit 113 detects a position where the infrared ray is blocked. For example, the infrared detection processing unit 113 causes each light emission unit Ls disposed in the X direction and the Y direction to emit an infrared ray, receives the detection signal output from each light reception unit Rs, and detects the blocked position based on the detection signal in the X direction and the Y direction. In addition, the infrared detection processing unit 113 detects the input position (infrared input position Pb) with respect to the infrared touch sensor 23 based on the blocked position of the infrared ray (see FIG. 8, etc.). For example, the infrared detection processing unit 113 detects the blocked position in the X direction and the Y direction as the infrared input position Pb. The infrared detection processing unit 113 is an example of the second position detection processing unit of the present disclosure.

The position detection processing unit 114 detects the input position P1 with respect to the display panel 20 based on the electrostatic input position Pa detected by the electrostatic detection processing unit 112 (an example of the first position of the present disclosure), and the infrared input position Pb detected by the infrared detection processing unit 113 (an example of the second position of the present disclosure).

Details of a detection method for the input position P1 are described below. FIG. 8 schematically illustrates a state where the user points a finger from an oblique direction with respect to the display panel 20. Here, "Z1" represents the distance from the infrared touch sensor 23 to the center of gravity C1 of a user's hand when the infrared detection processing unit 113 detects a user's finger. Note that the distance Z1 is set in advance based on measurement results of a plurality of users, for example. In addition, "Z2" represents the distance from the display 21 to the center of gravity C1 and "Z3" represents the distance from the display 21 to the infrared touch sensor 23. In addition, in FIG. 8, "Pa" represents the electrostatic input position detected by the electrostatic detection processing unit 112, and "Pb" represents the infrared input position detected by the infrared detection processing unit 113.

Note that the distance Z1 may be set by measuring the distance from the electrostatic touch sensor 22 to the center of gravity C1 of the user's hand when the electrostatic detection processing unit 112 detects the user's hand, and subtracting the distance (interval) between the electrostatic touch sensor 22 and the infrared touch sensor 23 from the distance. Specifically, the distance Z1 may be set in advance by using the characteristics of any of the electrostatic touch sensor 22 and the infrared touch sensor 23, the design information, the measurement result, the shape of the input means (such as a hand and a finger) and the like.

Figure 9:
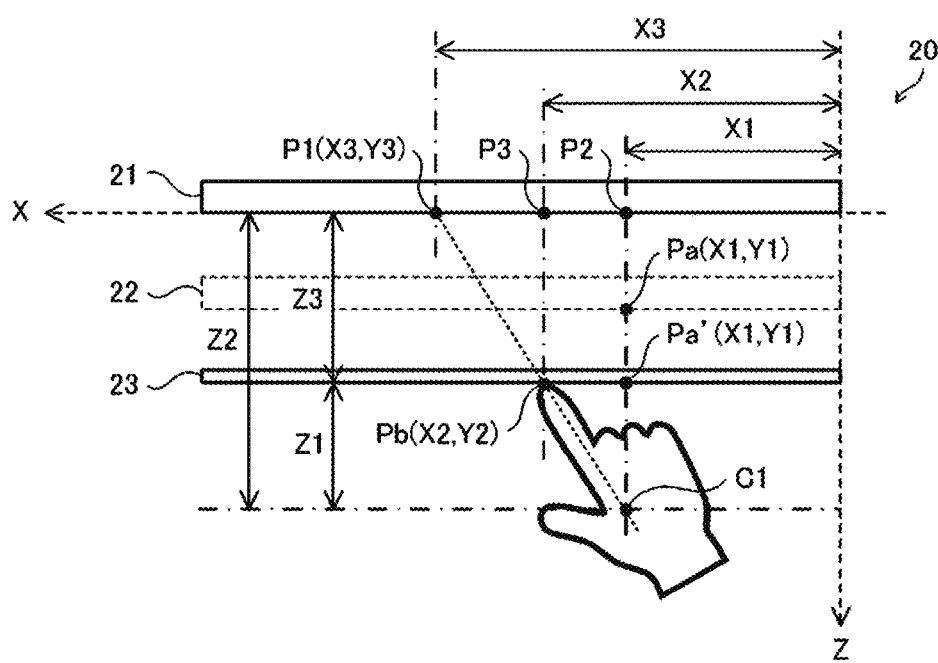
FIG. 9 is a schematic view illustrating an example of the detection method for the input position in the display device according to the embodiment of the present disclosure.
Figure 10:
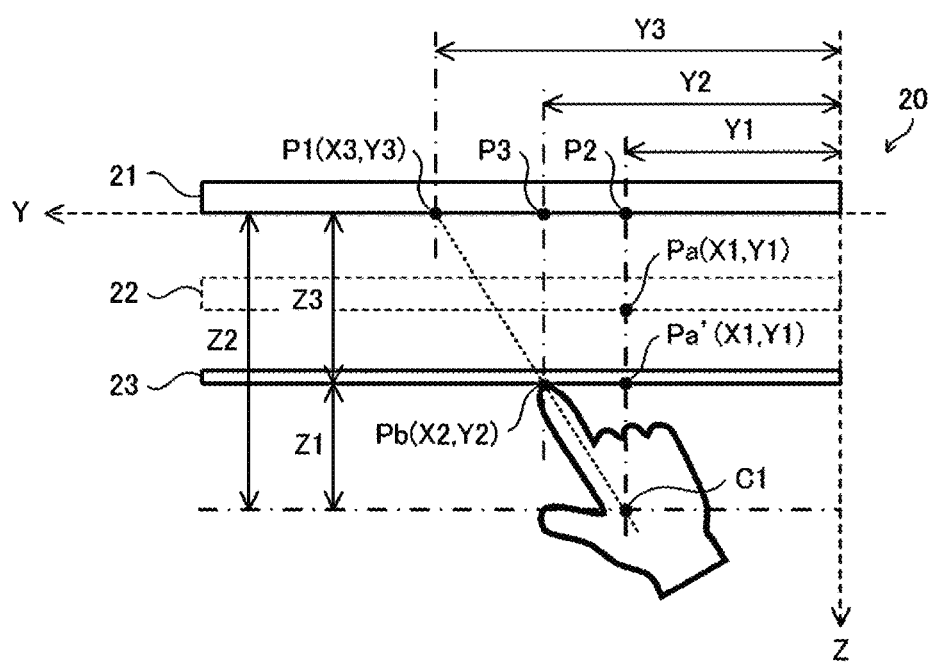
FIG. 10 is a schematic view illustrating an example of the detection method for the input position in the display device according to the embodiment of the present disclosure.

FIGS. 9 and 10 illustrate coordinate positions of the electrostatic input position Pa and the infrared input position Pb. FIG. 9 illustrates coordinate positions in the XZ plane, and FIG. 10 illustrates coordinate positions in the YZ plane. As illustrated in FIGS. 9 and 10, the X coordinate and the Y coordinate of the electrostatic input position Pa are represented by (x, y)=(X1, Y1), and the X coordinate and the Y coordinate of the infrared input position Pb are represented by (x, y)=(X2, Y2). Note that "Pa'" corresponds to the position where a straight line connecting the center of gravity C1 and the electrostatic input position Pa (a straight line that passes through the center of gravity C1 and is perpendicular to the display 21) intersects the infrared touch sensor 23. That is, the X coordinates and the Y coordinates of the position Pa, the position Pa', and the center of gravity C1 coincide with each other.

The position detection processing unit 114 calculates a correction amount K based on the difference (X2–X1, Y2–Y1) between the coordinate (X1, Y1) of the position Pa' and the coordinate (X2, Y2) of the infrared input position Pb, and detects, as the input position P1 (X3, Y3), the coordinate obtained by adding the calculated correction amount K to the coordinate (X1, Y1) of the position Pa'.

Note that (X2-X1) represents the distance between the position Pa' corresponding to the electrostatic input position Pa and the infrared input position Pb in the X direction in the case where the infrared touch sensor 23 is set as an XY coordinate plane (see FIG. 9), and (Y2-Y1) represents the distance between the position Pa' corresponding to the electrostatic input position Pa and the infrared input position Pb in the Y direction in the case where the infrared touch sensor 23 is set as an XY coordinate plane (see FIG. 10).

The correction amount K is a value obtained by multiplying the difference by a proportionality coefficient k1, and is expressed by the following Equation (1).

$$K = k1(X2 - X1, Y2 - Y1) \tag{1}$$

k1 is a proportionality coefficient, and is expressed by the following Equation (2), for example. Specifically, the proportionality coefficient k1 is a ratio corresponding to the distance Z2 from the display 21 to the center of gravity C1 in the direction perpendicular to the display 21 (an example of the first distance of the present disclosure), and the distance Z1 from the infrared input position Pb to the center of gravity C1 in the direction perpendicular to the display 21 (an example of the second distance of the present disclosure).

$$k1 = Z2/Z1 \tag{2}$$

The coordinate (X3, Y3) of the input position P1 is expressed by the following Equation (3).

$$(X3, Y3) = (X1 + k1(X2 - X1), Y1 + k1(Y2 - Y1)) \tag{3}$$

Specifically, the position detection processing unit 114 calculates the coordinate (X3, Y3) of the input position P1 from the similarity of the right triangle with the interior angle of 90 degrees at the position Pa' and the oblique side as the straight line connecting the center of gravity C1 and the infrared input position Pb, and the right triangle with the interior angle of 90 degrees at position P2 (the position where the perpendicular line passing through the center of gravity C1 intersects the display 21) and the oblique side as the straight line connecting the center of gravity C1 and the input position P1.

Note that the position detection processing unit 114 may calculate the coordinate (X3, Y3) of the input position P1 from the following Equations (4) and (5) instead of the above-described Equations (2) and (3).

$$k1 = Z3/Z1 \tag{4}$$

$$(X3, Y3) = (X2 + k1(X2 - X1), Y2 + k1(Y2 - Y1)) \tag{5}$$

Specifically, the position detection processing unit 114 may calculate the coordinate (X3, Y3) of the input position P1 from the similarity of the right triangle with the interior angle of 90 degrees at the position Pa' and the oblique sides as the straight line connecting the center of gravity C1 and the infrared input position Pb, and the right triangle with the interior angle of 90 degrees at position P3 (the position where the perpendicular line passing through the infrared input position Pb intersects the display 21) and the oblique side as the straight line connecting the infrared input position Pb and the input position P1.

In the above-described manner, the position detection processing unit 114 detects the input position P1 with respect to the display panel 20 (the display 21) based on the electrostatic input position Pa detected by the electrostatic detection processing unit 112, and the infrared input position Pb detected by the infrared detection processing unit 113. In addition, the position detection processing unit 114 calculates the correction amount K based on the difference between the coordinate (X1, Y1) of the position Pa (the position Pa') and the coordinate (X2, Y2) of the infrared input position Pb, and detects, as the input position P1, the coordinate (see the above-described Equation (3)) obtained by adding the calculated correction amount K to the coordinate of the position Pa (the position Pa'), or the coordinate (see the above-described Equation (5)) obtained by adding it to the coordinate of the infrared input position Pb.

When the input position P1 is detected by the position detection processing unit 114, the control unit 11 executes an input process corresponding to the user's input operation for the detected input position P1. For example, the control unit 11 moves the input operation icon A1 and/or selects the selection object with the input operation icon A1 in accordance with the input position P1.

Input Detection Process

Figure 11:
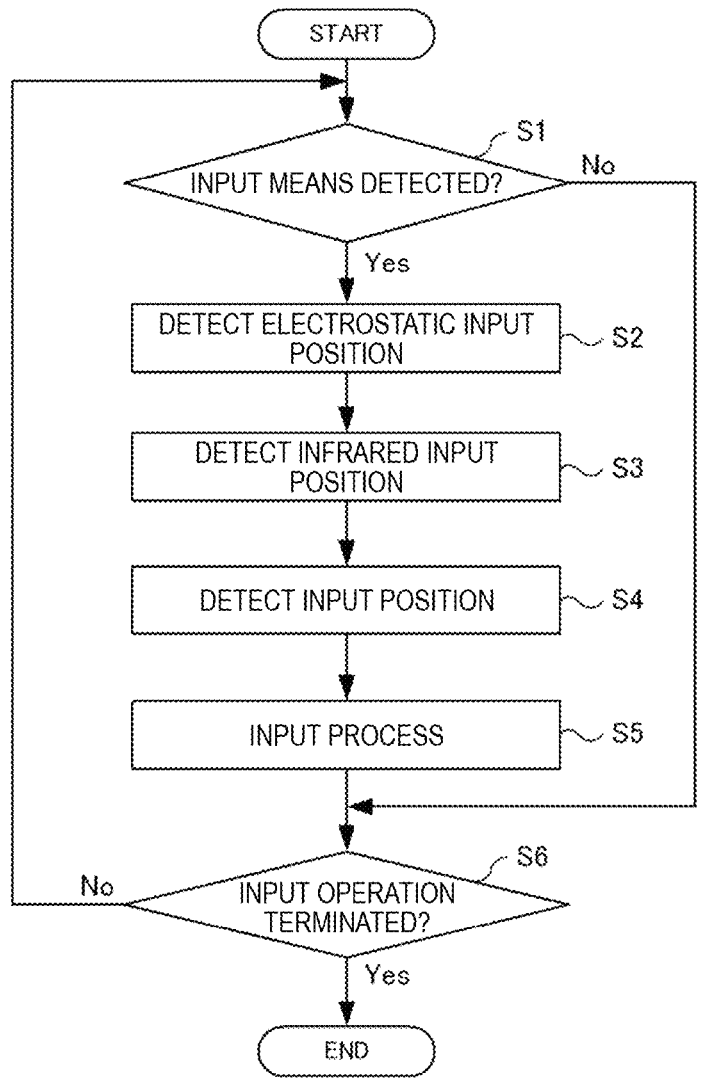
FIG. 11 is a flowchart for describing an example of a procedure of an input detection process executed by the display device according to the embodiment of the present disclosure.

An input detection process executed by the control unit 11 of the display device 1 is described below with reference to FIG. 11.

Note that the present disclosure may be taken as a disclosure of an input detection method (an example of the input detection method of the present disclosure) of executing one or a plurality of steps included in the input detection process, and one or a plurality of steps included in the input detection process described here may be omitted as necessary. Note that each step in the input detection process may be executed in a different order as long as the same operational effects are achieved. Further, while a case where the control unit 11 executes each step in the input detection process is described as an example here, an input detection method in which a plurality of processors executes each step in the input detection process in a distributed manner is also conceivable as another embodiment.

First, at step S1, the control unit 11 determines whether an input means has been detected. For example, the control unit 11 determines that an input means (such as a user's hand) has been detected when there is a change in the detection result of at least one of the electrostatic touch sensor 22 and the infrared touch sensor 23 (when there is a change in the capacitance, or blocking of the infrared ray). As another embodiment, in the case where the display device 1 includes a camera, the control unit 11 may detect the input means based on images captured by the camera. When detecting the input means (S1: Yes), the control unit 11 advances the process to step S2. The control unit 11 waits until the input means is detected (S1: No).

At step S2, the control unit 11 detects the electrostatic input position Pa. More specifically, the control unit 11 detects the input position (the electrostatic input position Pa) at the electrostatic touch sensor 22 based on the change of the capacitance acquired from the electrostatic touch sensor 22. The electrostatic input position Pa is the XY coordinate position in the case where the electrostatic touch sensor 22 is set as an XY plane (see FIGS. 9 and 10).

Next, at step S3, the control unit 11 detects the infrared input position Pb. More specifically, the control unit 11 detects the input position (the infrared input position Pb) at the infrared touch sensor 23 based on the blocked position of the infrared ray. The infrared input position Pb is the XY coordinate position in the case where the infrared touch sensor 23 is set as an XY plane (see FIGS. 9 and 10). Note that the order of processes of step S2 and S3 is not limited.

Next, at step S4, the control unit 11 detects the input position P1 with respect to the display panel 20 (the display screen 20A). More specifically, the control unit 11 detects the input position P1 in the display 21 based on the electrostatic input position Pa and the infrared input position Pb. For example, the control unit 11 calculates the correction amount K (see the above-described Equation (2)) based on the difference between the coordinate (X1, Y1) of the position Pa (the position Pa') and the coordinate (X2, Y2) of the infrared input position Pb, and detects, as the input position P1, the coordinate (see the above-described Equation (3)) obtained by adding the calculated correction amount K to the coordinate of the position Pa (the position Pa'). As another embodiment, the control unit 11 calculates the correction amount K (see the above-described Equation (4)) based on the difference between the coordinate (X1, Y1) of the position Pa (the position Pa') and the coordinate (X2, Y2) of the infrared input position Pb, and detects, as the input position P1, the coordinate (see the above-described Equation (5)) obtained by adding the calculated correction amount K to the coordinate of the infrared input position Pb.

In the above-described manner, the control unit 11 calculates the input position P1 in the display 21 through coordinate conversion of the input position (the electrostatic input position Pa) at the electrostatic touch sensor 22 and the input position (the infrared input position Pb) at the infrared touch sensor 23 in accordance with the distance from the display 21 (Z1 to Z3).

Next, at step S5, the control unit 11 executes the input process. For example, the control unit 11 moves the input operation icon A1 and/or selects the selection object with the input operation icon A1 in accordance with the detected input position P1.

Next, at step S6, the control unit 11 determines whether the input operation has been completed. When the user terminates the input operation with respect to the display panel 20, the control unit 11 determines that the input operation has been completed (S6: Yes), and terminates the input detection process. On the other hand, when the user continues the input operation with respect to the display panel 20, the control unit 11 determines that the input operation is not terminated (S6: No), and advances the process to step S1. In the above-described manner, the control unit 11 executes the input detection process.

As described above, the display device 1 according to the present embodiment detects the input position P1 of the input operation with the input means with respect to the display panel 20 including the display 21, the capacitive first sensor (the electrostatic touch sensor 22) and the infrared second sensor (the infrared touch sensor 23). In addition, the display device 1 detects the first position (the electrostatic input position Pa) of the input operation at the first sensor, detects the second position (the infrared input position Pb) of the input operation at the second sensor, and detects the input position P1 with respect to the display panel 20 based on the first position and the second position.

With the above-described configuration, for example, when the user points a finger from an oblique direction with respect to the display panel 20 (touch panel) (see FIG. 7), the position (the input position P1) of the direction pointed by the finger can be appropriately detected. Thus, the detection accuracy of the input position of the input operation with respect to the display panel 20 can be improved.

Figure 12:
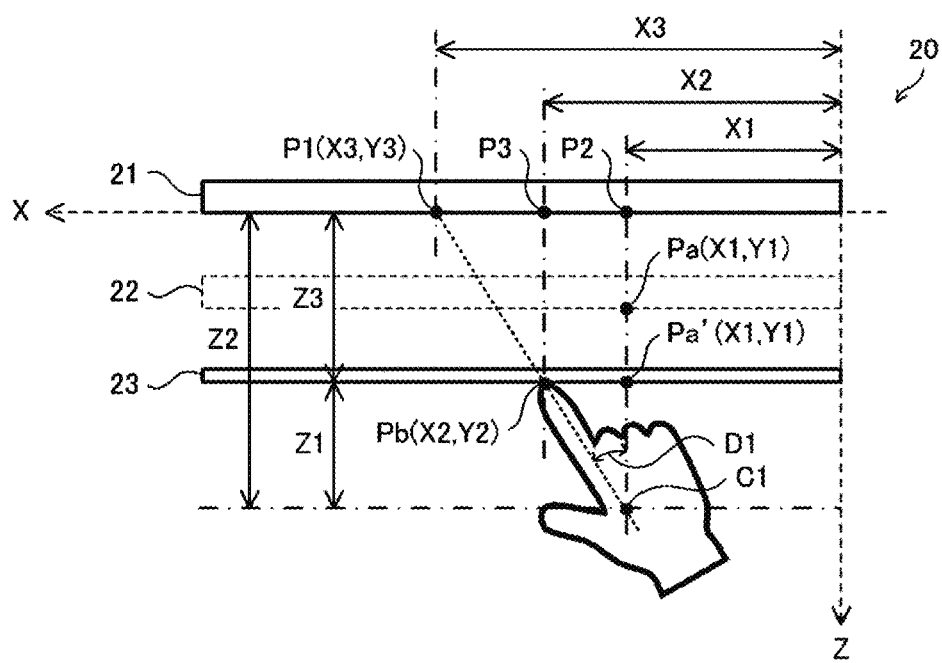
FIG. 12 is a schematic view illustrating an example of a detection method for an input position in a display device according to another embodiment of the present disclosure.

As another embodiment of the present disclosure, the control unit 11 may calculate the input position P1 by using the pointing angle (incident angle) of an input means (such as a user's finger) with respect to the display panel 20. For example, in FIG. 12, in the case where "D1" represents the angle between the direction pointed by the user's finger with respect to the display panel 20 (the display 21) and the direction that passes through the center of gravity C1 and is perpendicular to the display 21, the control unit 11 may calculate the coordinate (X3, Y3) of the input position P1 from the following Equations (6) and (7) by using the trigonometric function. Note that while the following Equations (6) and (7) express only calculation expressions of the X coordinate (X3) of the input position P1, the Y coordinate (Y3) may also be calculated from the same expression corresponding to the pointing angle.

$$X3 = X1 + Z2 \times \tan(D1) \tag{6}$$

$$D1 = \tan^{-1}((X2 - X1)/Z1) \tag{7}$$

The above-described display device 1 is an example of the input detection apparatus of the present disclosure, but the input detection apparatus of the present disclosure may be a control apparatus including the input processing unit 111, the electrostatic detection processing unit 112, the infrared detection processing unit 113, and the position detection processing unit 114. Specifically, the input detection apparatus of the present disclosure may be included in the display device 1 (which corresponds to the control unit 11 of FIG. 1), or may be composed of a control apparatus (e.g., a server) disposed outside the display device 1 to perform the display control of the display device 1.

Supplementary Notes of Disclosure

An overview of the disclosure derived from the above-described embodiment is noted below.

Note that each configuration and processing function described in the following supplementary notes may be arbitrarily selected and combined.

Supplementary Note 1

An input detection apparatus that detects an input position of an input operation with an input means with respect to a display panel including a display, a first sensor of capacitive type and a second sensor of infrared type, the input detection apparatus including: a first position detection pressing circuit that detects a first position of the input operation at the first sensor, a second position detection pressing circuit that detects a second position of the input operation at the second sensor, and an input position detection pressing circuit that detects the input position with respect to the display panel based on the first position detected by the first position detection pressing circuit and the second position detected by the second position detection pressing circuit.

Supplementary Note 2

The input detection apparatus according to Supplementary Note 1, in which the first position detection pressing circuit detects the first position based on a change of a capacitance at the first sensor, and the second position detection pressing circuit detects the second position based on a blocked position of an infrared ray at the second sensor.

Supplementary Note 3

The input detection apparatus according to Supplementary Note 1 or 2, in which the input position detection pressing circuit calculates a correction amount based on a difference between a coordinate of the first position and a coordinate of the second position, and detects, as the input position, a coordinate obtained by adding the correction amount that is calculated to the coordinate of the first position or the coordinate of the second position.

Supplementary Note 4

The input detection apparatus according to Supplementary Note 3, in which the correction amount is a value obtained by multiplying the difference by a proportionality coefficient.

Supplementary Note 5

The input detection apparatus according to Supplementary Note 4, in which the proportionality coefficient is a ratio corresponding to a first distance and a second distance, the first distance being a distance from the display to the input means in a direction perpendicular to the display, the second distance being a distance from the second position to the input means in the direction perpendicular to the display.

Supplementary Note 6

The input detection apparatus according to any one of Supplementary Notes 1 to 5, in which the input operation is a non-contact input operation with respect to the display panel.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An input detection apparatus that detects an input position of an input operation performed via an input means with respect to a display panel including a display, a first sensor of a capacitive type, and a second sensor of an infrared type, the input detection apparatus comprising:
a first position detection pressing circuit that detects a first position of the input operation at the first sensor;
a second position detection pressing circuit that detects a second position of the input operation at the second sensor; and
an input position detection pressing circuit that detects the input position with respect to the display panel based on the first position detected by the first position detection pressing circuit and the second position detected by the second position detection pressing circuit,
wherein the input position detection pressing circuit calculates a correction amount based on a difference between a coordinate of the first position and a coordinate of the second position, and detects, as the input position, a coordinate obtained by adding the calculated correction amount to the coordinate of the first position or the coordinate of the second position.

2. The input detection apparatus according to claim 1, wherein the first position detection pressing circuit detects the first position based on a change of a capacitance at the first sensor, and
the second position detection pressing circuit detects the second position based on a blocked position of an infrared ray at the second sensor.

3. The input detection apparatus according to claim 1, wherein the correction amount is a value obtained by multiplying the difference by a proportionality coefficient.

4. The input detection apparatus according to claim 3, wherein the proportionality coefficient is a ratio corresponding to a first distance and a second distance, the first distance being a distance from the display to the input means in a direction perpendicular to the display, the second distance being a distance from the second position to the input means in the direction perpendicular to the display.

5. The input detection apparatus according to claim 1, wherein the input operation is a non-contact input operation with respect to the display panel.

6. An input detection method of detecting an input position of an input operation performed via an input means with respect to a display panel including a first sensor of a capacitive type and a second sensor of an infrared type, the input detection method being executed by one or more processors, the input detection method comprising:
detecting a first position of the input operation at the first sensor;
detecting a second position of the input operation at the second sensor; and
detecting the input position with respect to the display panel based on the first position and the second position, wherein detecting the input position comprises:
calculating a correction amount based on a difference between a coordinate of the first position and a coordinate of the second position, and
detecting, as the input position, a coordinate obtained by adding the calculated correction amount to the coordinate of the first position or the coordinate of the second position.

7. A non-transitory computer-readable recording medium coupled to one or more processors and storing an input detection program that detects an input position of an input operation performed via an input means with respect to a display panel including a first sensor of a capacitive type and a second sensor of an infrared type, the input detection program, when executed by the one or more processors, causing the one or more processors to:
detect a first position of the input operation at the first sensor;
detect a second position of the input operation at the second sensor; and detect the input position with respect to the display panel based on the first position and the second position, wherein detecting the input position comprises:
  calculating a correction amount based on a difference between a coordinate of the first position and a coordinate of the second position, and
  detecting, as the input position, a coordinate obtained by adding the calculated correction amount to the coordinate of the first position or the coordinate of the second position.

* * * * *